United States Patent [19]
Piotrowski

[11] 4,086,315
[45] Apr. 25, 1978

[54] PRODUCTION OF HOLLOW PLASTIC BODIES

[75] Inventor: Tadeusz Piotrowski, 21 rue Ampere, Lagny, Seine et Marne, France

[73] Assignees: Tadeusz Piotrowski; Societe Nouvelle du Plastique, both of France

[21] Appl. No.: 718,083

[22] Filed: Aug. 26, 1976

[30] Foreign Application Priority Data

Aug. 27, 1975   France ................................ 75 26375

[51] Int. Cl.² ............................................. B29C 17/07
[52] U.S. Cl. ..................... 264/97; 264/296; 425/533
[58] Field of Search .............. 264/89, 94, 97, 296, 264/323; 425/242 B, 324 B, 387 B, DIG. 209, DIG. 204, 533, 535; 215/1 C

[56] References Cited
U.S. PATENT DOCUMENTS

| | | | |
|---|---|---|---|
| 3,137,748 | 6/1964 | Makowski | 264/97 |
| 3,301,928 | 1/1967 | Plymale | 264/97 |
| 3,349,155 | 10/1967 | Valyi | 264/97 |
| 3,412,186 | 11/1968 | Piotrowski | 264/97 X |

*Primary Examiner*—Jan H. Silbaugh
*Attorney, Agent, or Firm*—Craig & Antonelli

[57] ABSTRACT

Hollow plastic bodies are obtained by a process wherein plastic material is blown within a mold. This process includes heat injecting of the plastic material under pressure into a mold having a blow plunger and centering means for the head of the plunger to provide a parison having impressions from the centering means, transferring the plunger and associated parison into a mold, applying a force on parts of the parison that have impression holes to close the holes by extrusion, blowing the parison and unmolding the hollow body thus obtained.

5 Claims, 8 Drawing Figures

U.S. Patent      April 25, 1978      4,086,315
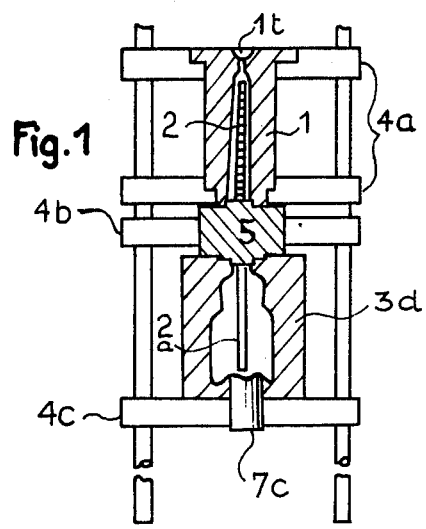
Fig. 1
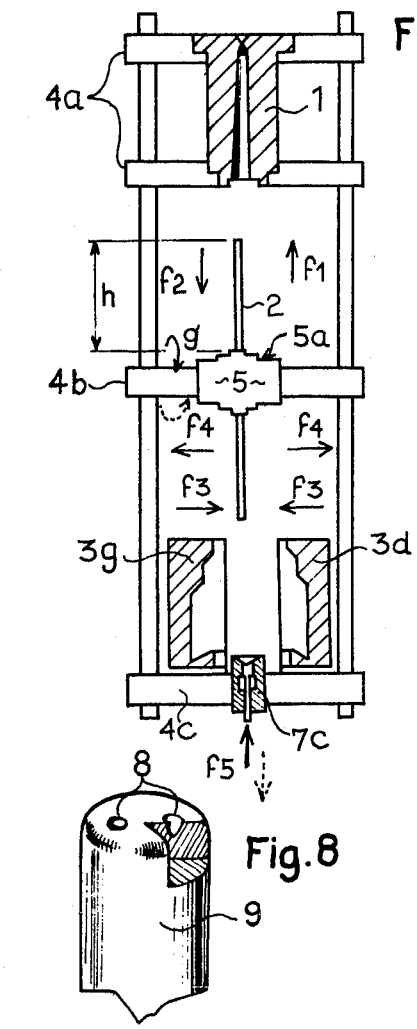
Fig. 2
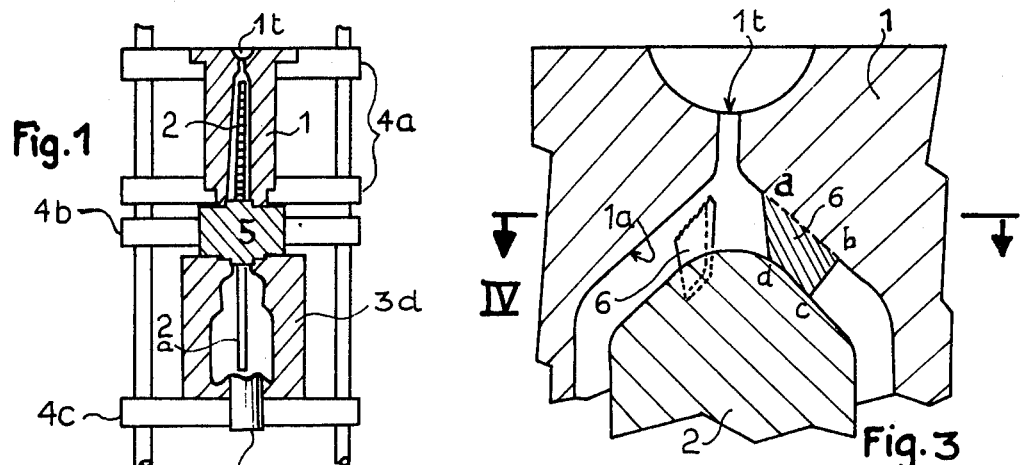
Fig. 3
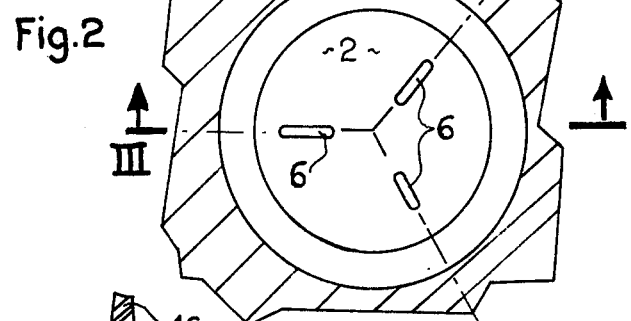
Fig. 4
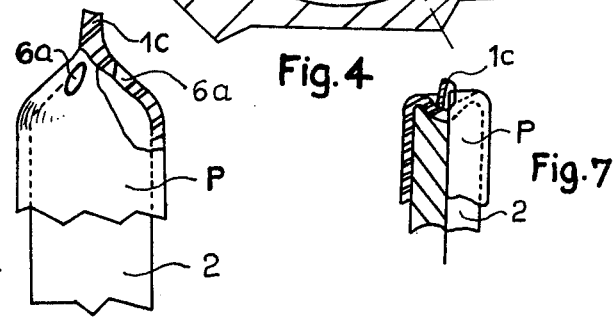
Fig. 5     Fig. 7
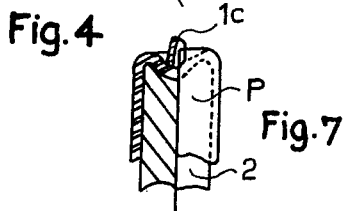
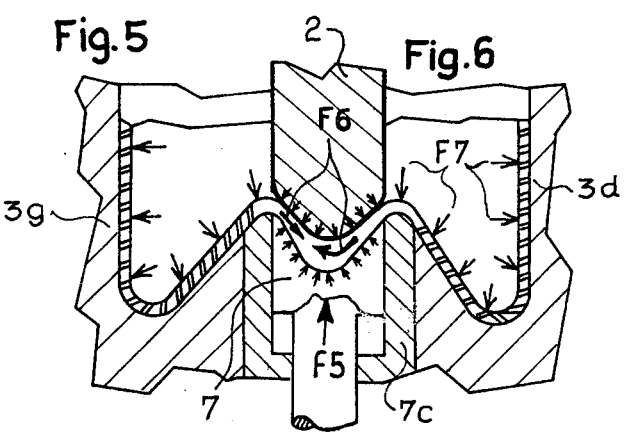
Fig. 6
Fig. 8

PRODUCTION OF HOLLOW PLASTIC BODIES

The invention concerns improvements in apparatus and process for industrial production of hollow plastic bodies, by blow-molding a parison, i.e. a shaped mass of molten thermoplastic material.

Processes and apparatus are known that allow industrial scale production of bottles, flasks and similar hollow bodies by injection of hot pasty plastic material in a plunger mold, to get a parison, and then by blowing of the parison in a mold whose configuration and dimensions are suitable for those of the hollow body.

Apparatus of this type having a parison mold and plunger arranged for blowing and a mold that is suitable so that after an injection of plastic material it will suffice to separate the mold from its plunger charged with a parison, and then to effect another cooperation of the plunger and mold to get a hollow body are known.

Now, there are difficulties that arise in the course of such injection of plastic material, in ensuring stability of a perfectly centered plunger in its mold when, because of the configuration and dimensions of the hollow body, the plunger is substantially elongated with reference to its radial dimensions. This "centering" is then all the more imperative, to the extent that the parison wall is thin, to save material.

French Pat. No. 962,726 has already proposed, to get around this difficulty in that there is provided axial engagement of a finger fixed to the mold bottom, in a seat arranged on a "head" of the plunger, to produce a hollow body like a case, by simple molding.

But the application of such "plunger-mold" fixation, in a more recent state of the technology of injection as described in French Pat. No. 1,381,933, entails complicated arrangements of channels in the mold bottom, to allow a conventional axial position of an injection press, to feed the mold.

According to this patent, the axial hole corresponding to the imprint in the parison is closed by extrusion when the mold is closed, because of a rolling working of the edges of the mold bottom on the mass of the parison head. This work does not exclude a loss of material by shearing, whereas the seat of the finger may be unfavorable for these operations.

U.S. Pat. No. 3,305,892 suggests a process wherein a parison plunger head is centered in its mold by contact along a line that is radially distant from an axial feed hole, but after a first injection stage along the lateral wall of the parison, the plunger has to be pulled back to allow a second injection stage that avoids, in the parison, an impression hole in the form of a cup corresponding to the linear contact of the plunger head. Now, this retraction of the plunger that separates the two injection stages generally has serious repercussions on the behavior of the parison in the course of blowing.

This invention is intended to alleviate these drawbacks.

Its purpose is:

To develop a process suitable for industrial production of hollow bodies by blowing a parison. Such a process comprises:
hot injecting a plastic material under pressure in a mold that is furnished with a blow plunger and means for centering the head of the plunger to obtain a parison that presents impression holes from the centering means;
transferring the plunger with its parison into a mold;
applying a force on the parts of the parison that present impression holes, to close them by extrusion of the plastic material;
blowing of the parison by means of the plunger; and
unmolding of the hollow body thus prepared.

According to the invention, the process further consists in:
injecting a quantity of plastic material that corresponds precisely to that which constitutes the hollow body;
holding the plunger immobilized in a centered position, up to the end of injection into the mold; and
applying an axial thrust on that part of the parison that presents impression holes, to close them without loss of plastic material.

The invention also concerns apparatus well suited for efficiently carrying out the process as described above. Such apparatus comprises:
a mold presenting an axial feed hole,
a blow plunger having a head at one end,
means for centering the plunger head in the mold, spaced radially with reference to a feed hole, e.g. means of a known type with engagement of a finger in a seat,
a blow mold, and
means to ensure extrusion of the material to close the impression holes made by the centering means.

Such apparatus, notable in that the means for extrusion of the plastic material have the form of means for striking or for axial thrust, avoid any throwing off of material.

It is to be understood that such molding, with axial thrust in the direction of the plunger head, can involve an extrusion that is very favorable for good occlusion of holes that correspond to impressions of the centering means: this result does not entail any loss of material.

Moreover, such an eccentric position of the means for fixing the plunger head is in good relationship with the position of the feed hole, allowing a good supply to the mold as well as good centering of the plunger.

The means for centering the plunger may be similar to means proposed by the known technique, namely fingers intended to be engaged in suitable seats.

But the plunger head portion may advantageously have a convex shape (conical, ogival...) and the corresponding bottom of the mold may present an element or system of stop elements that ensure contact on the plunger at at least three mutually separated points, adapted to the centering of the plunger with reference to the mold.

The invention also concerns a parison and a hollow body coming from a blowing operation in a suitable mold. This parison and this hollow body may be readily identified, namely by traces or scars corresponding to impressions of the piston or spurs of an apparatus similar to what was described above.

Other characteristics and advantages of the invention will appear from the following description, with reference to the attached drawings which are only presented as non-limitative embodiments.

In these drawings:

FIG. 1 shows schematically, in axial section and on a small scale, an apparatus according to the invention;

FIG. 2 is a view similar to that shown in FIG. 1, which allows explanation of the operation of the apparatus of FIG. 1;

FIGS. 3 and 4 respectively, show in axial and cross section, on a larger scale, an essential part of the apparatus of FIG. 1;

FIGS. 5 and 6 are figures in section, for explanation of the use of the apparatus of FIG. 1;

FIG. 7 shows in elevation, partly cut away, a variant of an essential element of the apparatus of FIG. 1; and FIG. 8 shows in perspective partly cut away another variant of this essential element of the apparatus of FIG. 1.

The apparatus shown in FIGS. 1 and 2 is of a type that is well known and in fact is similar to that described in French Pat. No. 1,430,090. It comprises essentially, on the one hand:

a mold 1 with which there may be associated a plunger or care 2, to allow production of a parison by injection of plastic material and, on the other hand, two mold parts 3d, 3g that can be moved transversely with reference to the plunger, to form a blow mold for the parison, to produce a hollow body.

The dimensions, especially the axial dimensions of mold 1 and mold parts 3d, 3g are suitable for those of plunger 2, to allow cooperation as described below.

Mold 1 has a seat in the shape of an approximately cylindrical casing whereof the side wall has clearance suitable for disengagement of a parison "P", and bottom 1a of this casing has an axial hole 1t that can be brought in the usual way into coaxial alignment with the channel of a nozzle of an injection press for hot, viscous plastic material, by virtue of crosswise frame elements 4a that support mold 1. The press is not illustrated.

Plunger 2 is fixed perpendicularly by one of its ends to a transverse surface 5a of a support 5 that is mounted to pivot about a cross axis on other transverse elements 4b of the frame, to allow 180° swings (arrows g), the frame elements 4b being associated with conventional means for axial displacement (arrows $f_1, f_2$) which are not illustrated.

In this example, support 5 bears two identical plungers which are diametrically opposed with reference to their axis of swing, to allow a better rhythm in use of the apparatus, but the present description only refers to one of them.

Surface 5a is adapted to provide an ordinary closure of the opening of the seat in mold 1 when plunger 2 has been engaged at its free end (arrow $f_1$) in the seat. The dimensions of the seat, and of plunger 2, present differences that are, respectively, equal to the thickness of corresponding parts of parison "P".

Further, mold parts 3d, 3g are mounted in a known way on other elements of frame 4c, also associated with means for axial displacement (arrows $f_1, f_2$) and presenting means (not illustrated) to ensure transverse displacements of the said mold parts 3d, 3g (arrows $f_3, f_4$).

When plunger 2 has been disengaged from mold 1 (arrow $f_2$) by "retraction" of frame elements 4b and 4c (FIG. 2) the plunger can be swung (arrow g) into position 2a, and after return of elements 4b, 4c to their original positions (FIG. 1), the "mold" 3 formed of parts 3d and 3g, can be closed on said plunger 2 (arrow $f_3$), the free edges of mold parts 3d, 3g being designed for closing contact on transverse face 5a and lateral gripping of the end part of the parison that corresponds to the "foot" of plunger 2.

Finally, it is noted that plunger 2 is made as a conventional blow plunger, and that its length "h" is substantially large, as compared to its radial dimensions.

In FIGS. 3 and 4, the bottom of mold 1 and the corresponding end or head of plunger 2 are shown.

This plunger head has the general form of a convex surface. In this example, this configuration is similar to that of a conical surface whose top has been lowered, by machining, to a small, almost spherical cap.

The corresponding part of mold 1 that constitutes the bottom 1a of the mold is practically a replica of the head of plunger 2. The part corresponding to the cap provides the opening of axial hold 1t mentioned above.

A small element 6 which is the product for example of machining of a plate along four straight sides of an irregular quadrilateral piece "a,b,c,d" presents a generally planar surface that is radially disposed with reference to the geometrical axes, common to mold 1 and plunger 2. Edge "a,b" of the element 6 is integral with conical bottom 1a of mold 1.

Opposite edge "c,d" practically parallel to edge "a,b" is a little bit smaller than the latter and is applied onto the conical head of plunger 2; whereas the other edges "bc–da" which are mutually opposed present respectively opposed slants with reference to the above-mentioned geometric axis. It is understood that the distance between bottom 1a of mold 1 and plunger head 2, by the stop effect of element 6, is a function of the axial dimensions of the latter. These dimensions are adapted to the thickness of a parison head.

Finally, two other elements identical with said element 6 are disposed similarly, in radial planes angularly separated by 120° with reference to the first element 6 and are also integral with the bottom of mold 1, along their edges "ab".

It is to be understood that these three elements 6 constitute three spurs or spacer guides that ensure firm, good coaxial centering of plunger 2 at the end of the engaging stroke of the piston, in mold 1 (arrow $f_1$).

Moreover, (as shown in FIGS. 1 and 7), the edges of the lower parts of mold parts 3d, 3g that correspond to the plunger head in position 2a are adapted to lateral engagement on a cylinder 7c which allows axial sliding of a small piston 7 whose free transverse face is made approximately as a replica of the plunger head, and this piston is associated conventionally with means for axial thrust and displacement. These means, which are not illustrated, and the cylinder 7c are mounted on the above-mentioned frame elements 4c.

The above description shows that plunger 2 can be brought (arrow $f_1$) to a perfectly centered position in its mold 1 so that an ordinary injection of plastic material will produce a parison "P" that has good uniformity of wall thickness (FIG. 5). This injection is effected axially between spurs 6.

Plunger 2 can then be separated from its mold 1 (arrow $f_2$) carrying the parison, which presents three small holes 6a (impressions of spurs 6) and a plug 1c. The slopes of edges "bc–da" establish clearance adapted to good separation of the spurs. Then it can be swung and brought into position 2a.

Mold parts or section 3d, 3g can then be closed on plunger 2 (arrow $f_3$) and piston 7 can be actuated (arrow $f_5$), in the direction of the parison head (FIG. 6) until it is applied thereto, after having compressed the plastic material of plug 1c. This compression and a thrust of piston 7 cause extrusion (arrows $f_6$) of the pasty plastic material, with the effect of closing the three holes 6a which correspond to the impressions of spurs 6. Moreover, the convex cone of piston 7 can be rather different from that of the head of plunger 2, to be adapted to the special requirements of extrusion of the plastic material that is utilized.

Then in the conventional way, blowing means associated with plunger 2 can be used to "blow the parison" (arrows $f_j$). The mold is then opened to provide a hollow body, and the cycle of operations mentioned above is repeated, to have mass production of such hollow bodies.

The hollow bodies thus obtained present on the axial part of their base three small "scars" that can be circumscribed in the impression left by the piston, which allows identification. Similarly, the parisons formed in the course of manufacture have three holes in their heads.

This manufacture obviously only uses material in an amount that corresponds precisely to that needed for the wall of a hollow body. On this point, we note that the conical configuration of the head of plunger 2 is just as suitable for good centering of the plunger imposed by the regularity of the parison thickness, without which the precise amount of material for the wall of the hollow body might have no effect (because of the length of the plunger with reference to its radial dimensions)
  for efficiency of an extrusion operation without loss of material, to close the impressions of the centering spurs.

The surface of the plunger head represented in FIGS. 3 to 6 is convex but it could be concave (FIG. 7), and other convex or concave configurations such as ellipsoids, ogives, etc. could bring about results similar to those mentioned above.

Also, spurs 6 could be replaced by stop elements on the plunger, ensuring usual centering by "contact at at least three points" presenting good clearance for unmolding of the parison.

Besides, good maintenance in the centered position of the plunger and good material feed could be obtained by means of "fingers" similar to those of known techniques.

It would suffice (FIG. 8) to have two mold fingers (not illustrated) radially distant from the axis of the feed hole and adapted to conventional engagement in seating holes 8, suitably provided on the head of a plunger 9 whose transverse face would be planar.

Obviously, these holes should present clearance adapted to good unmolding of the "grains" that would be formed on the bottom of the hollow body by an extrusion process with thrust of piston 7. This would not be hampered by holes 8 because of the axial direction of the thrust, contrary to the transverse compression of known techniques.

What is claimed is:

1. A process for the manufacture of a hollow plastic body, wherein a parison of plastic material is formed in a parison mold having a blow core and centering means for positioning the head of the core at one end of said parison mold and the parison is subsequently shaped into the hollow body within a blow mold having an axially displaceable bottom portion, which comprises positioning the blow core within said parison mold so that said core and said parison mold define a parison-forming cavity, with said centering means having at least one spacer element that extends through said cavity at said one end of said mold; injecting hot plastic material under pressure into the parison forming cavity and around said at least one spacer means whereby at least one hole extends through the parison of plastic material; removing the parison on said core from said parison mold; transferring the core and said parison into said blow mold; positioning the core closely adjacent to the bottom portion of said blow mold, with said at least one hole in the parison being located between said core and said bottom portion; effecting axial displacement of said bottom portion of said blow mold towards said core to close said at least one hole by extrusion of said plastic material; blowing the parison mold into said hollow body within said blow mold and then unmolding the hollow body from said blow mold.

2. The process according to claim 1, wherein said core is axially inserted into said parison mold until the head of said core contacts the at least one spacer means of said centering means.

3. The process according to claim 2, wherein said core is axially displaced from said parison mold after injection of said plastic material whereby said at least one hole is formed in the parison upon removal of said at least one spacer means from contact with said core.

4. The process according to claim 3, wherein said plastic material is injected into said parison-forming cavity through an opening axially located above the head of said core whereby the entering plastic material passes around the at least one spacer means of said centering means, and whereby upon removal of said core and parison from said parison mold, a plug of plastic material extending axially from said parison is formed.

5. The process according to claim 4, wherein upon axial displacement of said bottom portion of said blow mold towards the head of the core, said plug of plastic material is compressed to effect closing of the at least one hole in said parison.

* * * * *